United States Patent [19]

Munday et al.

[11] 4,175,111

[45] Nov. 20, 1979

[54] REMOVAL OF PHOSPHINE FROM PHOSPHINE-CONTAMINATED CARBON MONOXIDE GAS STREAMS

[75] Inventors: Theodore F. Munday, Kendall Park; John Walden, Hightstown, both of N.J.

[73] Assignee: FMC Corporation, Philadelphia, Pa.

[21] Appl. No.: 860,377

[22] Filed: Dec. 14, 1977

[51] Int. Cl.² ............................................. B01D 53/34
[52] U.S. Cl. .................................... 423/210; 423/317; 423/322; 423/415 A; 423/648 R
[58] Field of Search ...................... 423/210, 64 R, 317, 423/322, 323, 415 A

[56] References Cited

U.S. PATENT DOCUMENTS 1,848,295   3/1932   Ipatiew .................................. 423/317

FOREIGN PATENT DOCUMENTS 2252 of 1892  United Kingdom ...................... 423/322

OTHER PUBLICATIONS

Van Wazer, "Phosphorus and Its Compounds", Interscience Publishers, Inc., N.Y., vol. I, 1958, pp. 188-189.
Schumb et al., "Hydrogen Peroxide", Reinhold Publishing Co., New York, N. Y., 1955, pp. 400 & 401.

Primary Examiner—Earl C. Thomas
Attorney, Agent, or Firm—Milton Zucker; Frank Ianno

[57] ABSTRACT

Off gases from electric furnace production of phosphorus, consisting essentially of carbon monoxide and phosphine, are heated to 700°-800° C. to decompose the phosphine to red phosphorus and hydrogen; the red phosphorus is separated from the gas—most desirably by passing the gas through aqueous hydrogen peroxide which oxidizes the phosphorus to phosphoric acid,—to obtain a clean gas which can be used as a fuel.

3 Claims, 1 Drawing Figure

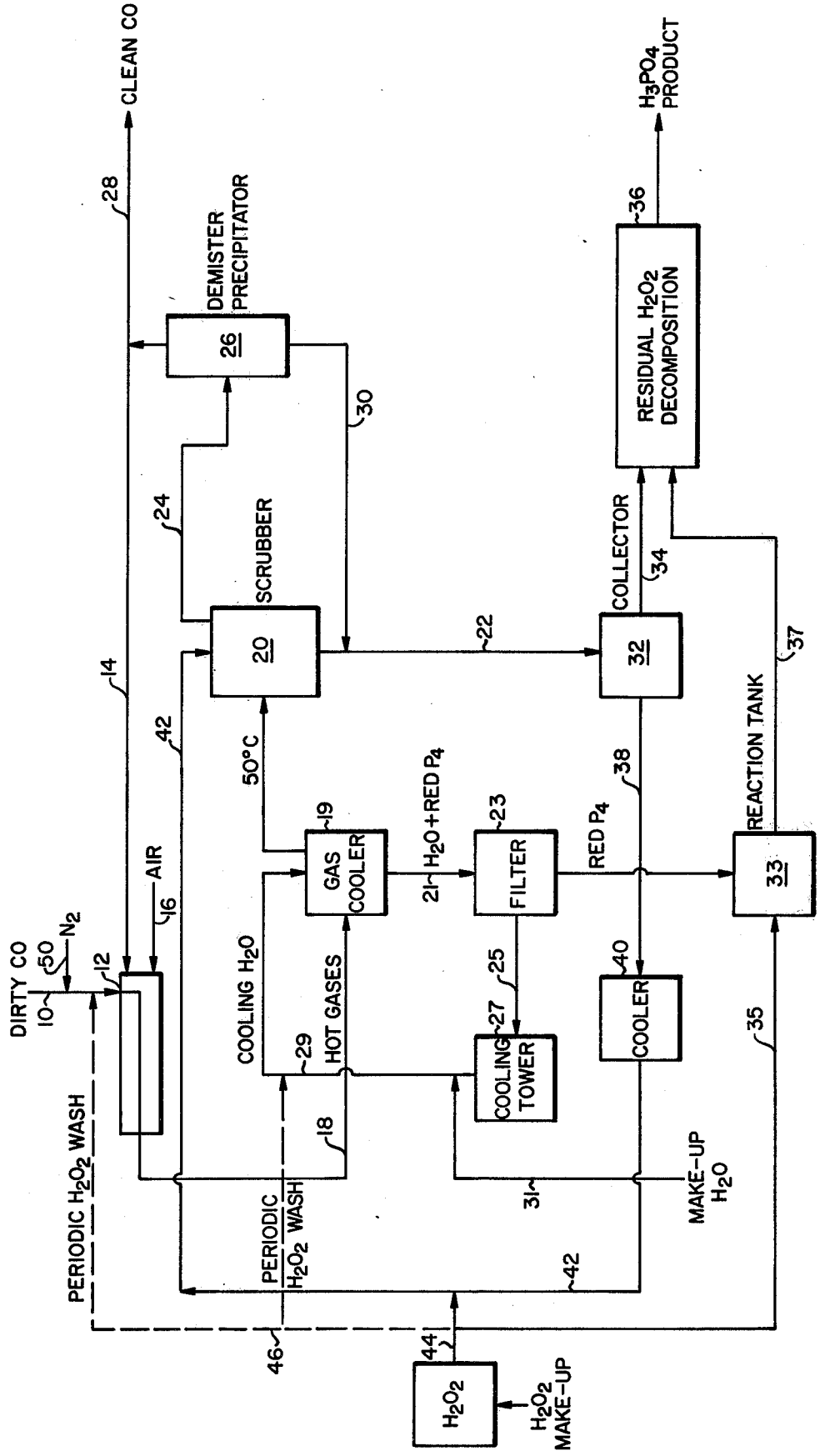

REMOVAL OF PHOSPHINE FROM PHOSPHINE-CONTAMINATED CARBON MONOXIDE GAS STREAMS

This invention relates to the electric furnace preparation of phosphorus in which carbon reacts with phosphate rock to produce elemental phosphorus and a gaseous mixture of carbon monoxide and phosphine, and is directed to a method for removing phosphine from the gas to produce a gas which is useful as a fuel.

In the production of elemental phosphorus, prepared agglomerates of ground phosphate rock are charged into an electric arc furnace along with coke and silica; the coke reduces the phosphate rock to elemental phosphorus; slag and ferrophosphorus are formed, and an off-gas produced which, after condensing the phosphorus, generally contains upwards of 90% of carbon monoxide, the amount of water vapor expected by equilibrium in the condenser—2 to 3%—a few percent each of nitrogen and hydrogen, under 1% of carbon dioxide, sometimes very small amounts of oxygen, and a small amount of phosphine—of the order of 0.1 to 0.3%. Prior to condensing the phosphorus product the furnace off-gas is passed through an electrostatic precipitator to remove solids; these solids, in aqueous slurry, are oxidized, generally in a fluidized bed, to produce a waste which can be dumped without environmental damage.

Unfortunately, the small amounts of phosphine in the carbon monoxide make the product unfit for in-plant use as a fuel. In boilers the metaphosphoric acid formed by the combustion of phosphine soon fouls the heat-exchange surfaces; in heating a fluid bed, the fluidizing grid soon plugs up. It has been necessary to flare the off-gas because of this fouling and plugging, thus losing the potential fuel value of the CO in the off-gases. Hence, an economic process for the removal of phosphine from this off-gas is desirable.

Phosphine is known to undergo various chemical reactions, and removal by one of those reactions is clearly indicated. However, the known reactions have not been studied heretofore in sufficient depth to ensure that small quantities of phosphine in essentially gaseous carbon monoxide can be removed rapidly and efficiently, so that removal becomes economically sound. For example, phosphine is known (Van Wazer, *Phosphorus and its Compounds.* New York: Interscience Publishers, Inc., 1958, Vol. 1, pp 188–189) to decompose at elevated temperatures, 500° C. and higher, as a first order reaction, into red phosphorus and hydrogen. However, the effect of large quantities of diluent gas on the reaction rate appears not to have been studied.

It has now been found that off-gases from electric furnace production of phosphorus, consisting essentially of CO, small quantities of other gases and a fraction of one percent of $PH_3$, can be economically treated to remove phosphine by heating the off-gases to from about 700° C. to about 800° C. for appropriate time periods—from about 1-2 seconds at 800° C. to about 4-5 seconds at 700° C.—to decompose the phosphine virtually quantitatively to red phosphorus and hydrogen, and thereafter separating the red phosphorus from the gas stream. Most desirably, the separation of the red phosphorus is obtained by scrubbing the gas containing the red phosphorus in suspension with aqueous hydrogen peroxide, or other soluble peroxide, which converts the red phosphorus to phosphoric acid which is recovered from solution, while the red phosphorus-free off-gas is recycled as fuel.

The drawing is a flow sheet of the preferred embodiment of the invention.

The preferred embodiment of the instant invention is illustrated in the flow sheet. The off-gas from the phosphorus furnace after condensation of the $P_4$ product (over 90% CO, under 1% $PH_3$ and the remainder diluents including nitrogen, hydrogen, $CO_2$, $H_2O$) is fed through line 10 into a furnace 12, where it is heated to 700° C.-800° C. by burning a portion of the clean CO (from line 14) with air (from line 16). The line 10 may be coiled or otherwise extended in the furnace to ensure efficient heat transfer and the necessary residence time. In the furnace 12, the $PH_3$ decomposes to red phosphorus and hydrogen. The suspension of red phosphorus in gas is fed through line 18 through a gas cooler 19 into a scrubber 20, where it is scrubbed with aqueous hydrogen peroxide. Here, the red phosphorus reacts with the peroxide to form soluble phosphoric acid. The phosphoric acid solution is drawn off the bottom through line 22; the gas is drawn off in line 24, is cleaned of entrained liquid in a demisting precipitator 26, and exits at the top, part going to burner 12 in line 14, and the balance through line 28 to be used as fuel. The condensed mist goes through line 30 to join the body of liquid in line 22.

The liquid is collected in a collector tank 32. A portion of the liquid is drawn off through line 34 to a tank 36, in which excess $H_2O_2$ is decomposed to give a solution of $H_3PO_4$ as product. Enough of the liquid is circulated back into the process to maintain the desired level in the scrubber, along with make-up peroxide, it exits through line 38 to a cooler 40, and thence through line 42 back to the scrubber, along with make-up peroxide from line 44.

A portion of the red phosphorus is washed out of the hot gas in the gas cooler 19, and exits with the cooling water in line 21 to a filter 23. The filtrate water passes through line 25 to a cooling tower 27 and is recirculated back to the gas cooler 19 through line 29, along with make-up water from line 31. The red phosphorus from filter 23 is fed to a reaction tank 33, where it is reacted with aqueous hydrogen peroxide from line 35; the reaction product is fed through line 37 to the peroxide decomposer 36.

From time to time as required, the furnace 12 is shut off to be cooled and cleaned, and peroxide is drawn through line 46, through furnace 12 and line 18; this removes any buildup of red phosphorus which may have formed in the lines. The cooling water line 29 may be similarly cleaned as needed.

The parameters of the process are relatively simple. In the furnace, the temperature should be between 700° C. and 800° C. for optimum results. Below 700° C., substantial complete decomposition of the phosphine requires excessive time while temperatures above 800° C. do not speed the reaction sufficiently to warrant the higher fuel cost. In this range, residence times of about 5 to 1 second are needed, depending on the temperature. Super-atmospheric pressure is not needed, although it can, of course, be used.

The separation of the small amounts of entrained red phosphorus from the gas may be done mechanically, and the phosphorus recirculated as such to the electric furnace. However, the recovery of such relatively small amounts of solids from a large volume of gas is a difficult problem, which requires a high capital investment, and provides difficulty in handling because of the reactivity of red phosphorus. The use of an aqueous system for recovery is therefore desirable. By using a hydrogen peroxide solution (or some other water soluble peroxide), the red phosphorus reacts as it contacts the liquid to form an aqueous solution of phosphoric acid (or its salt).

The absorption of red phosphorus in the peroxide solution proceeds satisfactorily at ambient temperatures, although temperature is not in any way critical, except that higher temperatures may cause peroxide decomposition. Nor is the peroxide concentration critical—optimum results from an economic viewpoint are obtained at about 1% concentration, although we have obtained satisfactory, if less economic, results at concentrations from 0.5 to 25%, and believe we would obtain satisfactory process results at even higher and lower concentrations.

The diluent gases present in the furnace off-gases present no problem. However, solid particles present in the off-gases may be troublesome. Hence, the off-gas should be carefully treated to remove solids. Moreover, we provide a line 50 for the introduction of nitrogen or other gas into the system to purge it of such material. The principal problem with solid impurities is that they may act as decomposition catalysts for the peroxide, and are thus capable of considerable fall-off in the efficiency of the peroxide. Even without the possible solid impurities, the tubes in the furnace may accumulate deposits of red phosphorus; when this occurs, they are washed out with peroxide solution, and then purged with nitrogen from line 50, as above described.

In our experimental work, we originally studied the decomposition of 1% $PH_3$ in nitrogen gas. Decomposition of $PH_3$ was measured by passing the reacted gas through two glass wool traps, and then determining residual $PH_3$ by gas chromatography. At 800° C. gas temperature, decomposition was 98% complete in 1.5 seconds. At 700° C., decomposition was over 90% complete in 5 seconds. At 650° C., only 44% of the $PH_3$ was decomposed after 1.8 seconds.

Similar results were obtained when CO was used to replace $N_2$. Additions of small amounts (under 5% total) of gaseous diluents, i.e. hydrogen, nitrogen and carbon dioxide, had no noticeable effects on the reaction rates.

Obviously, the invention may be practiced with a variety of changes not illustrated in the specification, and should be interpreted in accordance with the claims.

What is claimed is:

1. The process of removing phosphine from the off gas stream obtained after condensing phosphorus from the overhead stream from phosphorus producing furnaces, which gas stream is a mixture of gases containing over 90% of CO and less than 1% $PH_3$, which comprises heating said gas stream to a temperature of 700° C. to 800° C. for a time sufficient to substantially completely decompose the phosphine to red phosphorus and hydrogen, and then separating the red phosphorus from the gas stream, now substantially free of phosphine.

2. The process of claim 1, in which the time is between 5 seconds and 1 second.

3. The process of claim 1, in which the red phosphorus is separated by passing the gas into aqueous peroxide, which reacts with the red phosphorus to produce a water-soluble phosphate.

* * * * *